United States Patent
Hamman et al.

(10) Patent No.: US 6,302,221 B1
(45) Date of Patent: Oct. 16, 2001

(54) METHOD FOR PREDICTING QUANTITATIVE VALUES OF A ROCK OR FLUID PROPERTY IN A RESERVOIR USING SEISMIC DATA

(75) Inventors: Jeffry G. Hamman, Highlands Ranch; Donald H. Caldwell, Littleton; Stephen D. Wilson, Highlands Ranch, all of CO (US)

(73) Assignee: Marathon Oil Company, Findlay, OH (US)

( * ) Notice: Subject to any disclaimer, the term of this patent is extended or adjusted under 35 U.S.C. 154(b) by 0 days.

(21) Appl. No.: 09/584,063

(22) Filed: May 31, 2000

(51) Int. Cl.[7] .............................. G01V 1/00; G01V 1/34
(52) U.S. Cl. .................................. 175/50; 702/12
(58) Field of Search ................... 175/40, 42, 46, 175/48, 50; 367/73, 31, 83, 47; 702/12, 14, 13

(56) References Cited

U.S. PATENT DOCUMENTS

| | | | |
|---|---|---|---|
| 5,487,001 | * 1/1996 | Neff | 702/13 |
| 5,583,825 | * 12/1996 | Carrazzone et al. | 702/14 |
| 5,638,269 | * 6/1997 | Fournier et al. | 702/12 |
| 5,838,634 | 11/1998 | Jones et al. | 367/73 |

OTHER PUBLICATIONS

TDROV Promotional Flyer, Pioneering Geoscience, 1998.
S. Pharez et al., Layered Acoustic Impedance applied to the Ewan Field, Offshore Nigeria, SEG Expanded Abstracts, 1998.
S. Gluck et al., High-resolution impedance layering through 3-D stratigraphic inversion of postpack seismic data, The Leading Edge, Sep. 1997.
Mavko, G., et al., editors; Rock Physics Formulas, Rock Physics Laboratory, Stanford University, p. 61, 1993.

* cited by examiner

Primary Examiner—Robert E. Pezzuto
(74) Attorney, Agent, or Firm—Jack E. Ebel

(57) ABSTRACT

A method is provided for predicting a value of a designated rock or fluid property in a subterranean geologic volume. An experimentally determined seismic value of acoustic impedance is assigned to a model volume correlated to the subterranean geologic volume. A first predicted value of the designated rock or fluid property is also assigned to the model volume. A first predicted value of acoustic impedance for the model volume is calculated from a response model using the first predicted value of the designated rock or fluid property, wherein the response model is responsive to changes in predicted values of the designated rock or fluid property. The first predicted value of acoustic impedance is compared to the seismic value of acoustic impedance to determine a difference between the predicted and seismic values of acoustic impedance. The first predicted value of the designated rock or fluid property is adjusted in response to the difference to create a second predicted value of the designated rock or fluid property, wherein the second predicted value reduces the difference.

27 Claims, 8 Drawing Sheets

ERROR MINIMIZED (OR PREDICTED) VALUES ··········
EXPERIMENTAL VALUES ———

METHOD FOR PREDICTING QUANTITATIVE VALUES OF A ROCK OR FLUID PROPERTY IN A RESERVOIR USING SEISMIC DATA

TECHNICAL FIELD

The present invention relates generally to a method for creating a dimensional geologic model of a subterranean fluid reservoir. More particularly, the invention is a method for populating the dimensional geologic model with quantitative values of a designated rock or fluid property which are error minimized using a petrophysical response model and seismic data. The resulting dimensional geologic model facilitates exploration or production management of hydrocarbon-bearing reservoirs.

BACKGROUND OF THE INVENTION

In the exploration for hydrocarbons and the exploitation of hydrocarbons from subterranean environs, there is an ongoing need to accurately characterize subterranean reservoirs of interest. Knowing the areal extent, hydrocarbon content, and fluid permeability of a hydrocarbon-bearing reservoir is extremely important to reduce the risk of economic loss and conversely to increase the rate of return on hydrocarbon production from the reservoir. Such information regarding the subterranean reservoir is most readily obtained from one or more wells which are drilled through the reservoir. Drilling rates, drill cuttings, changes in drilling mud composition, and core samples from a well provide the requisite information. Logs generated by passing well logging tools through a well are also a good source of information. Logs provide valuable information concerning the rock and fluid properties of the subterranean reservoir, such as porosity, fluid identification, and shale volume. Exemplary logs include resistivity, gamma ray, density, compressional velocity, shear velocity, and neutron logs.

Since the logs only measure rock and fluid properties up to about one foot from the well bore and the vast majority of the reservoir is not penetrated by wells, the logs are unfortunately only capable of characterizing an extremely small fraction of a reservoir. Furthermore, the act of drilling stresses the rock surrounding the well bore, thereby changing the rock properties and introducing error into measurements obtained by well logging and core analysis. A long standing need exists to accurately characterize rock and fluid properties across substantially the entirety of a subterranean reservoir and, in particular, to accurately characterize rock and fluid properties in regions of the reservoir which are not sampled by wells.

Well data has conventionally been extrapolated away from the well bore to characterize the entirety of the reservoir when well data is limited. Conventional extrapolation techniques depict the subterranean reservoir as a plurality of three-dimensional arrays of blocks or cells which are integrated together to form a three-dimensional model of the reservoir. Typically, the X, Y and Z coordinates of each block are determined in both absolute elevation and stratigraphic surfaces and search algorithms are used to determine relative data points in the vicinity of each block. In addition, the rock properties of each block are assigned by means of estimation methods, such as distance based methods using interpolated averaging methods which are based upon nearby data values and geostatistical methods which account for both the distance and spatial continuity of rock properties.

Seismic surveys have also been used to provide seismic information over the portions of the subterranean reservoir which are not sampled by a well. Impact devices, such as vibratory sources, gas guns, air guns, and weight drops, are employed at the earthen surface or in a well bore as a seismic source to generate shear and compressional waves in the subterranean strata. These waves are transmitted through the subterranean strata, reflected at changes in acoustic impedance, and recorded, usually at the earthen surface, by recording devices placed in an array. This recorded data is typically processed using software which is designed to minimize noise and preserve reflection amplitude. The seismic surveys are ultimately evolved into three-dimensional data sets representing a direct measurement of the surfaces of the rock which define the subterranean reservoir. The data sets are increasingly used to evaluate and map subsurface structures for the purpose of exploring or exploiting oil, gas or mineral reserves. However, seismic data has not generally been utilized in three-dimensional geologic models for any purpose other than to define the top and base of the model. The present invention recognizes a need to more effectively integrate seismic data with geologic models for accurate characterization of subterranean reservoirs.

Accordingly, it is an object of the present invention to provide a method for more accurately predicting quantitative values of rock or fluid properties in a subterranean reservoir by the integrated use of seismic data and dimensional geologic models. It is another object of the present invention to provide a method for predicting quantitative values of rock or fluid properties in a subterranean reservoir which have specific utility for hydrocarbon exploration, enabling the practitioner to more accurately define the magnitude and bounds of a hydrocarbon-bearing reservoir. It is still another object of the present invention to provide a method for predicting quantitative values of rock or fluid properties in a subterranean reservoir which have specific utility for management of the hydrocarbon-bearing reservoir, enabling the practitioner to more closely maximize or otherwise optimize hydrocarbon production from the reservoir. These objects and others are achieved in accordance with the invention described hereafter.

SUMMARY OF THE INVENTION

The present invention is generally a method for creating a dimensional geologic model of a subterranean fluid reservoir which is populated with relatively precise quantitative rock or fluid property data. The resulting dimensional geologic model provides an accurate characterization of the fluid reservoir, thereby facilitating exploration or production management of hydrocarbon-bearing reservoirs. The method is performed by initially characterizing a geologic volume, including the fluid reservoir of interest, in terms of a model volume which is subdivided into a plurality of model subvolumes. The model subvolumes correlate to specified locations throughout the entirety of the geologic volume. Error-minimized values of a designated rock or fluid property are iteratively determined for each of the model subvolumes. The resulting error minimized values of an appropriately designated rock or fluid property have specific utility for hydrocarbon exploration, enabling the practitioner to more accurately define the magnitude and bounds of a hydrocarbon-bearing reservoir within the geologic volume. In addition or in the alternative, the resulting error minimized values of an appropriately designated rock or fluid property have specific utility for management of the hydrocarbon-bearing reservoir within the geologic volume, enabling the practitioner to more closely maximize or otherwise optimize hydrocarbon production from the reservoir.

In accordance with a specific embodiment of the present method a subterranean geologic volume is provided, wherein a distribution of seismic values of acoustic impedance has been experimentally determined for the geologic volume. The geologic volume is characterized by a model volume having a plurality of model subvolumes. A model subvolume is selected from the plurality of model subvolumes and a seismic value of acoustic impedance from the distribution is assigned to the model subvolume. A rock or fluid property relevant to the geologic volume is designated and a first predicted value of the designated rock or fluid property is also assigned to the model subvolume. A first predicted value of acoustic impedance for the model subvolume is calculated from a response model using the first predicted value of the designated rock or fluid property, wherein the response model is responsive to changes in predicted values of the designated rock or fluid property. The first predicted value of acoustic impedance is compared to the seismic value of acoustic impedance to determine a first difference between the predicted and seismic values of acoustic impedance. The first predicted value of the designated rock or fluid property is adjusted in response to the first difference to create a second predicted value of the designated rock or fluid property, wherein the second predicted value reduces the first difference.

Thereafter a second predicted value of acoustic impedance for the model subvolume is calculated from the response model using the second predicted value of the designated rock or fluid property. The second predicted value of acoustic impedance is compared to the seismic value of acoustic impedance to determine a second difference between the predicted and seismic values of acoustic impedance, wherein the second difference is less than the first difference. These steps are iteratively repeated until the difference does not exceed a predetermined maximum tolerance. The predicted value of the designated rock or fluid property upon termination of the iterative repetition is an error minimized value of the designated rock or fluid property for the selected subvolume. The method is repeated for another model subvolume until error minimized values of the designated rock or fluid property have been determined for every model subvolume of the model volume.

The invention will be further understood from the accompanying drawings and description.

DESCRIPTION OF PREFERRED EMBODIMENTS

Figure 1:
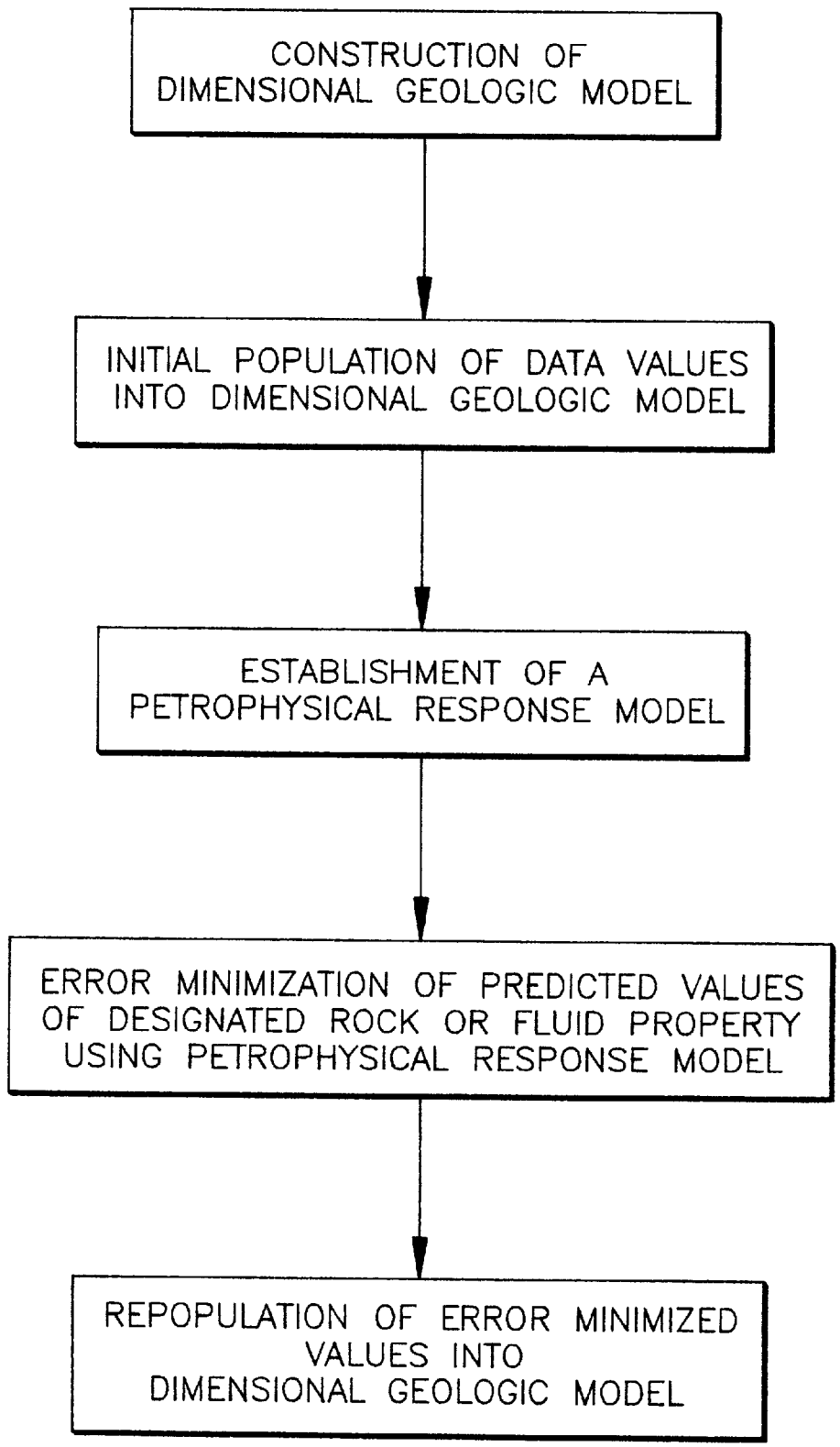
FIG. 1 is a schematic flowchart providing an overview of the method of the present invention.

An overview of the present method is shown in the flow chart of FIG. 1 and described below with reference to FIG. 1. The method comprises five stages. The first stage is construction of a dimensional geologic model based on an actual physical geologic volume which includes a fluid reservoir of interest. The dimensional geologic model comprises a model volume divided into an array of model subvolumes. The array of model subvolumes provides a dimensional framework for correlating experimental or predicted values of geophysical and petrophysical properties to specified locations within the geologic volume. The dimensional geologic model is constructed using a distribution of experimentally determined seismic values of acoustic impedance for the geologic volume and other known experimental or derived data relating to the geologic volume which are obtained preliminary to the present method.

The second stage of the method is initial population of data values into the dimensional geologic model. In accordance with the initial data population stage, quantitative values of certain geophysical and petrophysical properties of the geologic volume are assigned to the entirety of the dimensional geologic model. In particular, the experimentally determined seismic values of acoustic impedance from the above-recited distribution are assigned to every subvolume of the dimensional geologic model. Estimated values of rock and fluid properties of the geologic volume are also assigned to every subvolume of the dimensional geologic model. The estimated values of the rock and fluid properties include initial estimated values of the designated rock or fluid property (alternately termed first predicted values) which are of particular utility to the present method.

The third stage of the method is establishment of a petrophysical response model. In the petrophysical response model establishment stage one or more response equations are selected or otherwise derived from physical relationships between rock, fluid, and seismic properties in a reservoir, which are well known to those skilled in the art of rock and fluid physics. The response equations enable calculation of a predicted value of acoustic impedance by inserting the estimated values of the rock and fluid properties, including the predicted value of the designated rock or fluid property, into the response equations. As such, the petrophysical response model generates a predicted value of acoustic impedance which is responsive to changes in the predicted value of the designated rock or fluid property.

The fourth stage of the method is error minimization of the predicted values of the designated rock or fluid property. The error minimization stage is initiated by using the petrophysical response model and estimated values of the rock and fluid properties including the first predicted value of the designated rock or fluid property to calculate a first predicted value of acoustic impedance for a selected model subvolume. The error minimized value of the designated rock or fluid property is determined by comparing the first predicted value of acoustic impedance to the seismic value of acoustic impedance, iteratively adjusting the predicted value of the designated rock or fluid property in response to the comparison, and recalculating the predicted value of acoustic impedance using the petrophysical response model and adjusted predicted value of the designated rock or fluid property until an acceptable match is achieved between the predicted value and the seismic value of acoustic impedance. The predicted value of the designated rock or fluid property which achieves this match is the error minimized value of the designated rock or fluid property for the selected model subvolume. A new model subvolume is then selected and the error minimization stage is repeated until an error minimized value of the designated rock or fluid property has been determined for every model subvolume in the model volume. It is noted that the form of the petrophysical response model, the estimated values of the rock and fluid properties other than the designated rock or fluid property, and the seismic values of acoustic impedance are maintained fixed throughout the error minimization stage.

The fifth and final stage of the method is repopulation of the error minimized values into the dimensional geologic model. In accordance with the error minimized values repopulation stage, the error minimized values of the designated rock or fluid property are substituted for every corresponding first predicted value of the designated rock or fluid property which was initially populated into the dimensional geologic model in the second stage. The final product of the present method is a dimensional geologic model which is populated in its entirety with error minimized data values of the designated rock or fluid property and which is correlated to the geologic volume of interest.

Figure 2:
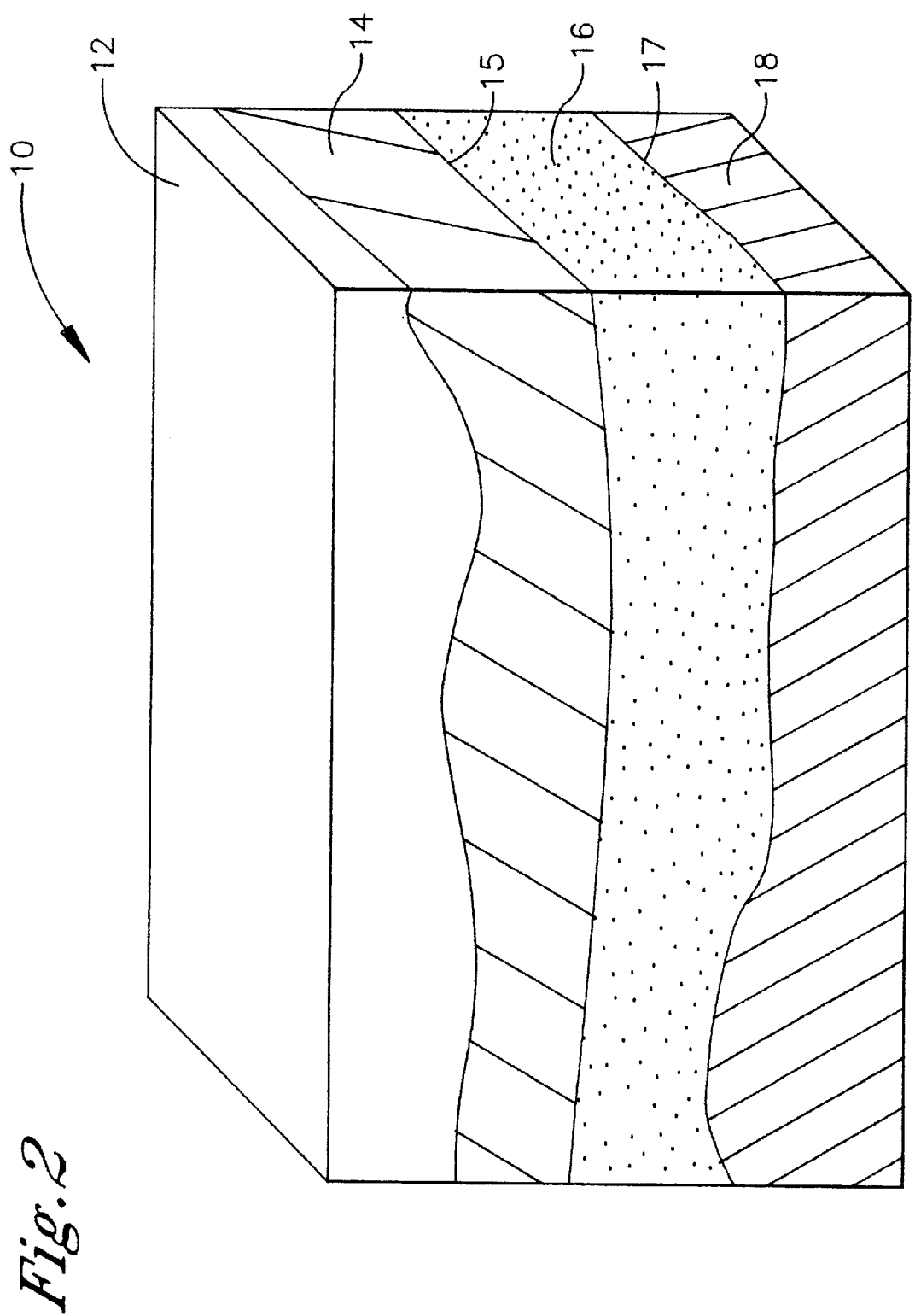
FIG. 2 is a schematic representation of a subterranean geologic volume including a fluid reservoir of interest.

A preferred embodiment of the method of the present invention is described below with reference to FIGS. 2–5. Referring initially to FIG. 2, a physical geologic volume is shown and generally designated 10. The method of the present embodiment is applicable to the geologic volume 10 which comprises an earthen surface 12 and a plurality of subterranean strata 14, 16, 18 containing rock and fluid materials. As such, the geologic volume 10 includes a fluid reservoir which is not specifically delineated in the Figures. The strata 14, 16, 18 extend beneath the earthen surface 12 in layers which are serially stacked with depth. The strata 14, 16, 18 are distinguished from one another by different rock and fluid properties. Accordingly, the respective strata 14, 16, 18 are separated by stratigraphic events which define reservoir sequence boundaries 15, 17. It is understood, however, that FIG. 2 is merely a conceptualized representation of a subterranean geologic volume. Practice of the present method is not limited to any specific geologic volume, but is generally applicable to substantially any geologic volume from which seismic data can be experimentally generated.

Figure 3A:
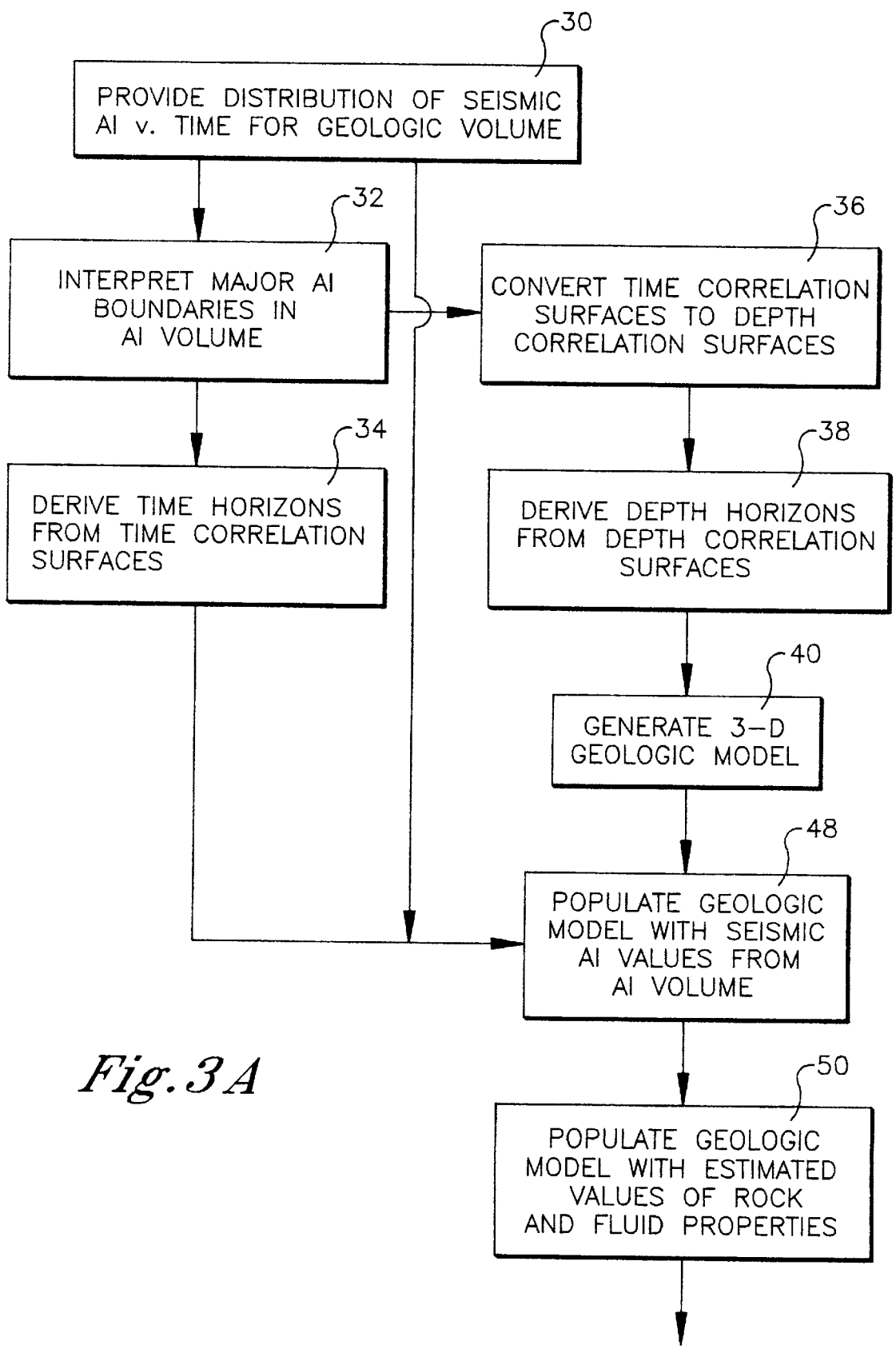
FIGS. 3A, 3B, 3C is a schematic flowchart showing a detailed embodiment of the method of FIG. 1.
Figure 3B:
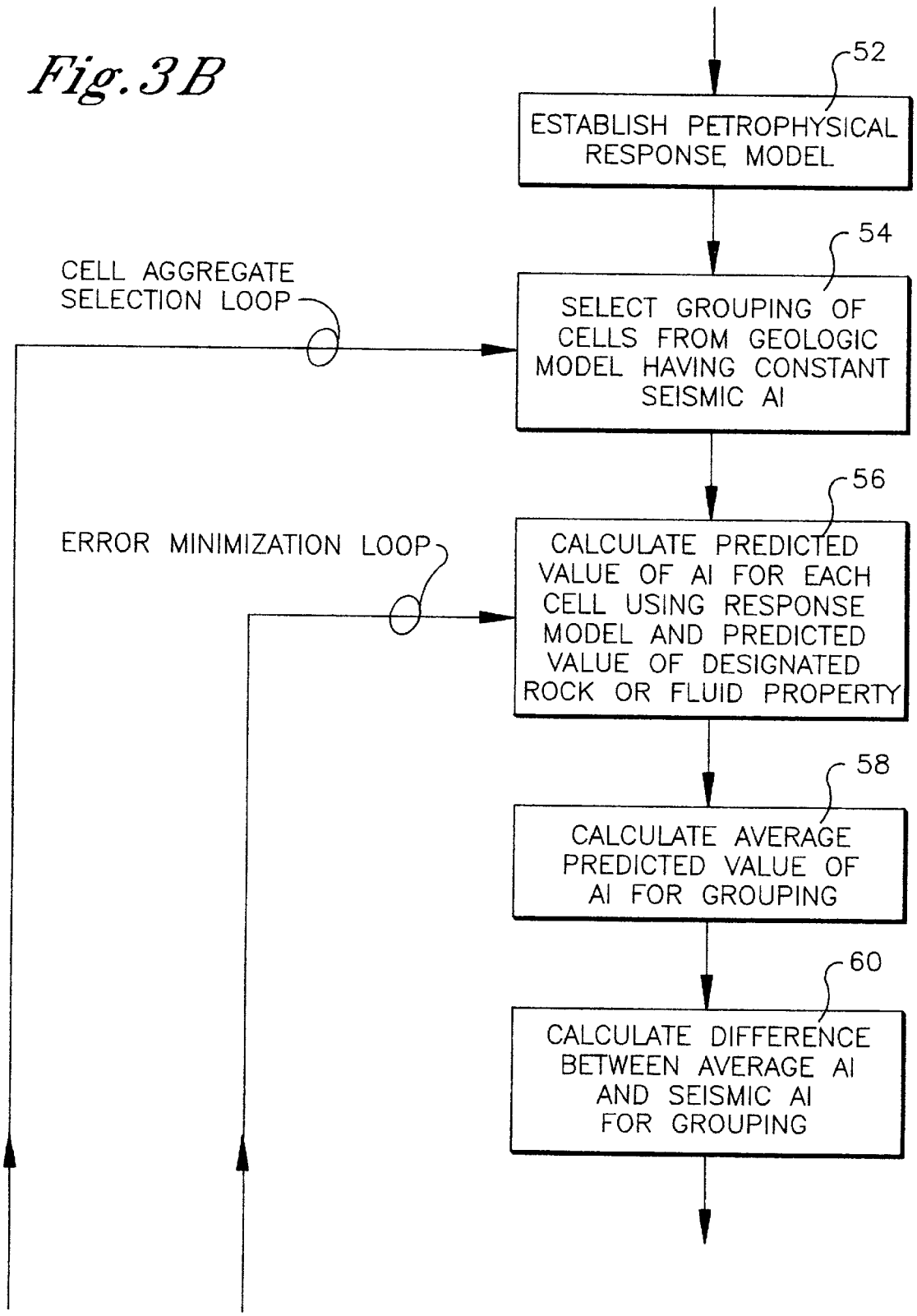
Figure 3C:
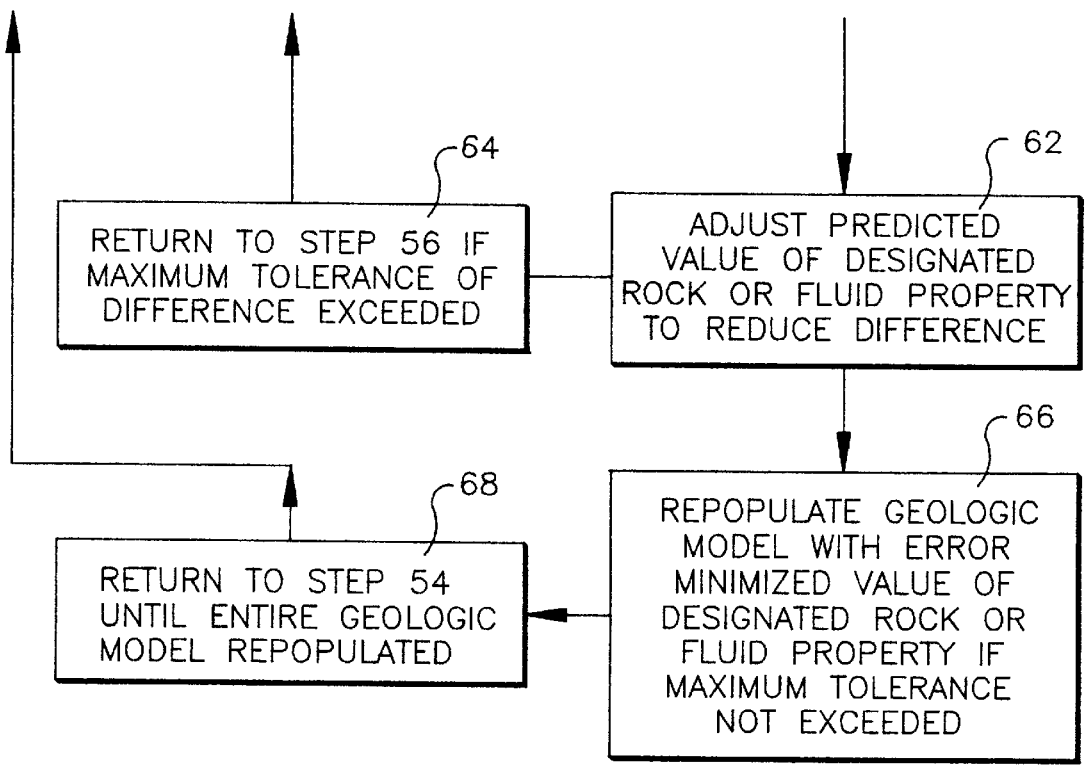

FIGS. 3A, 3B, 3C is a detailed flow chart of the present embodiment which depicts the method in a stepwise manner. Preliminary to initiating the present method, seismic data is experimentally generated in the geologic volume 10 of interest by a seismic survey using conventional methods well known to the skilled artisan. Seismic data is generally defined for purposes of the present method as information generated by creating seismic waves within a geologic volume from artificial seismic energy sources and observing the arrival times and amplitudes of waves which are refracted through high velocity intervals within the geologic volume or waves which are reflected from interfaces within the geologic volume in response to the seismic waves. Such interfaces are typically the result of changes in acoustic velocity or bulk density. A number of data processing techniques are commonly applied to the seismic data to reduce noise or otherwise render the data more meaningful. In particular, the present method utilizes the seismic data after the data has been converted to acoustic impedance using a conventional technique known as seismic inversion. A number of seismic inversion software packages are commercially available which process the seismic data, converting the data to a distribution of seismic values of acoustic impedance over time or depth within the geologic volume. An exemplary seismic inversion software package is available under the tradename "TDROV" from CGG Americas Inc., 16430 Park Ten Place, Houston, Tex. 77084, USA.

In addition to seismic data, a limited amount of well data relating to rock or fluid properties in the geologic volume 10 may also be available to the practitioner before the process is initiated. Such data is typically acquired from exploration or production wells (not shown) penetrating the geologic volume 10. As noted above, well data is extremely limited in areal scope, having reliability at best up to only about one radial foot away from the well bore. In any case, well data, if available, can be used in the practice of the present method as described hereafter. It is understood, however, that the availability of well data is not a prerequisite to practice of the present method. It is only required that a distribution of seismic values of acoustic impedance for the geologic volume 10 be preliminarily available or that seismic data be preliminarily available from which it is possible to generate the distribution. If seismic data is not preliminarily available for the geologic volume 10, seismic data can alternatively be generated for the geologic volume 10 by conducting a seismic survey as an incidental step of the present method.

Referring to FIGS. 3A, 3B, 3C, the present embodiment is initiated by step 30, wherein a distribution of seismic values of acoustic impedance over time is provided which has been obtained from the subterranean geologic volume 10 of FIG. 2. The distribution defines a three-dimensional seismic acoustic impedance volume (AI volume), wherein the x and y axes of the AI volume are in units of length and the z axis is in units of time. A three-dimensional (3-D) model of the geologic volume is constructed from the AI volume by steps 32, 34, 36, 38, 40. The 3-D geologic model has a model volume, wherein all three axes of the volume x, y, z are in units of length.

Step 32 initiates construction of the 3-D geologic model by interpreting the major acoustic impedance boundaries in the AI volume and confirming correlation of the acoustic impedance boundaries to the reservoir sequence boundaries. Changes in seismic acoustic impedance with time in the AI volume must correlate to changes in the rock or fluid properties with depth in the geologic volume. After it is confirmed that the correct acoustic impedance interface times occur at the correct stratigraphic events, gridded time correlation surfaces are plotted throughout the AI volume using grids of lines and cross-lines. Step 34 derives time horizons from the gridded time correlation surfaces, which are checked for negative isochron values. The time horizons are combined to complete a time layered framework.

Step 36 converts each gridded time correlation surface to a depth correlation surface using a best estimate of the average velocity to each horizon within the AI volume. Minor adjustments may be made to the depth correlation surfaces at well locations, if any, since the depth correlation surfaces do not usually identically match the horizon picks from the well locations. Minor adjustments may also be made to the depth correlation surfaces away from the well locations, if any, relying on the fact that fluid contacts are often identifiable as highly correlated spatial changes in the value of acoustic impedance. The estimated average velocities may also be readjusted in response to adjustments in the depth correlation surfaces. Step 38 derives depth horizons from the depth correlation surfaces, which are checked for negative isopach values. The depth horizons are combined to complete a depth layered framework. There is a one-to-one horizon correspondence between the depth layered framework and the time layered framework.

Figure 4:
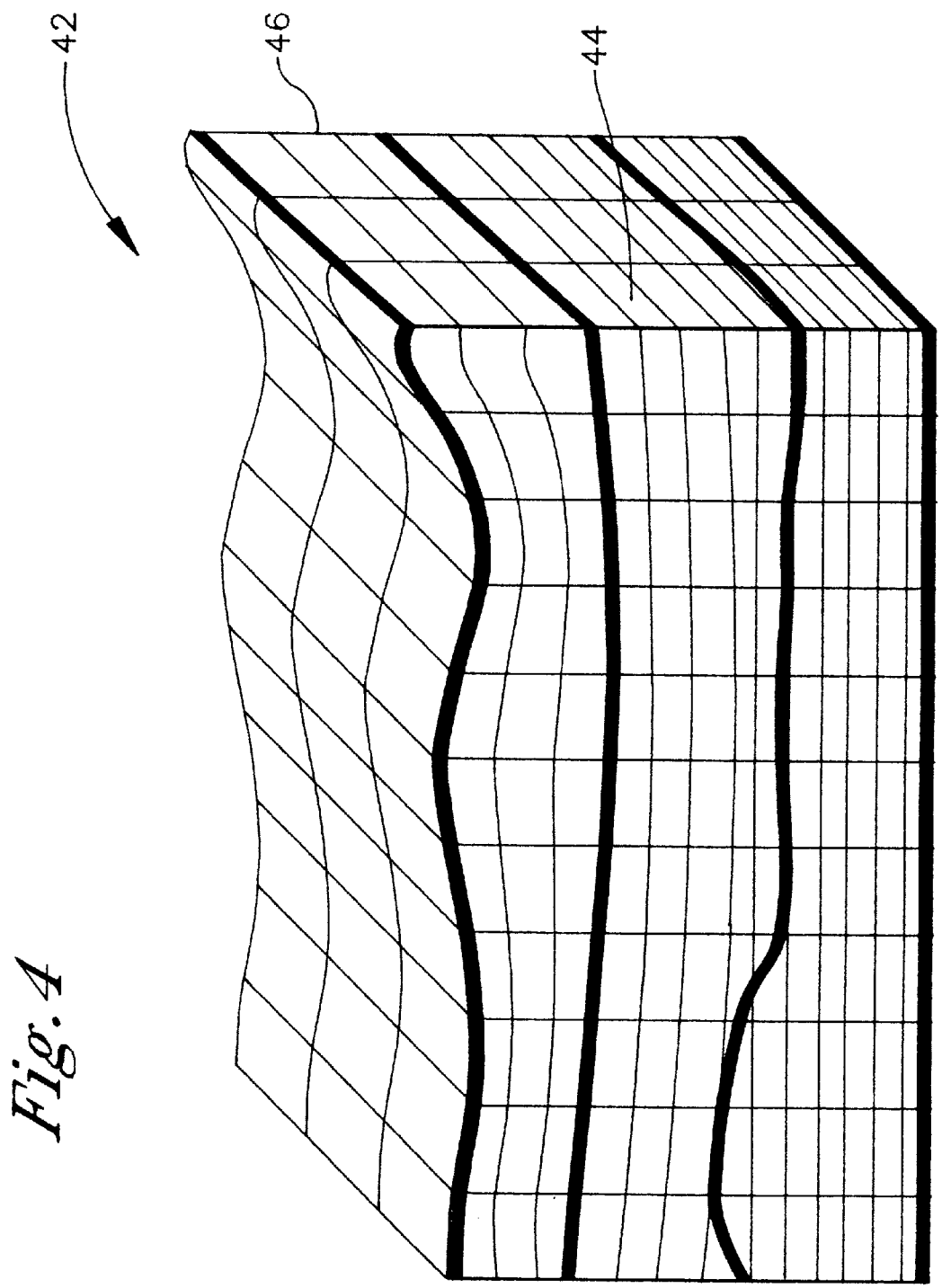
FIG. 4 is a schematic representation of a 3-D geologic model constructed in accordance with the embodiment of FIGS. 3A, 3B, 3C.
Figure 5:
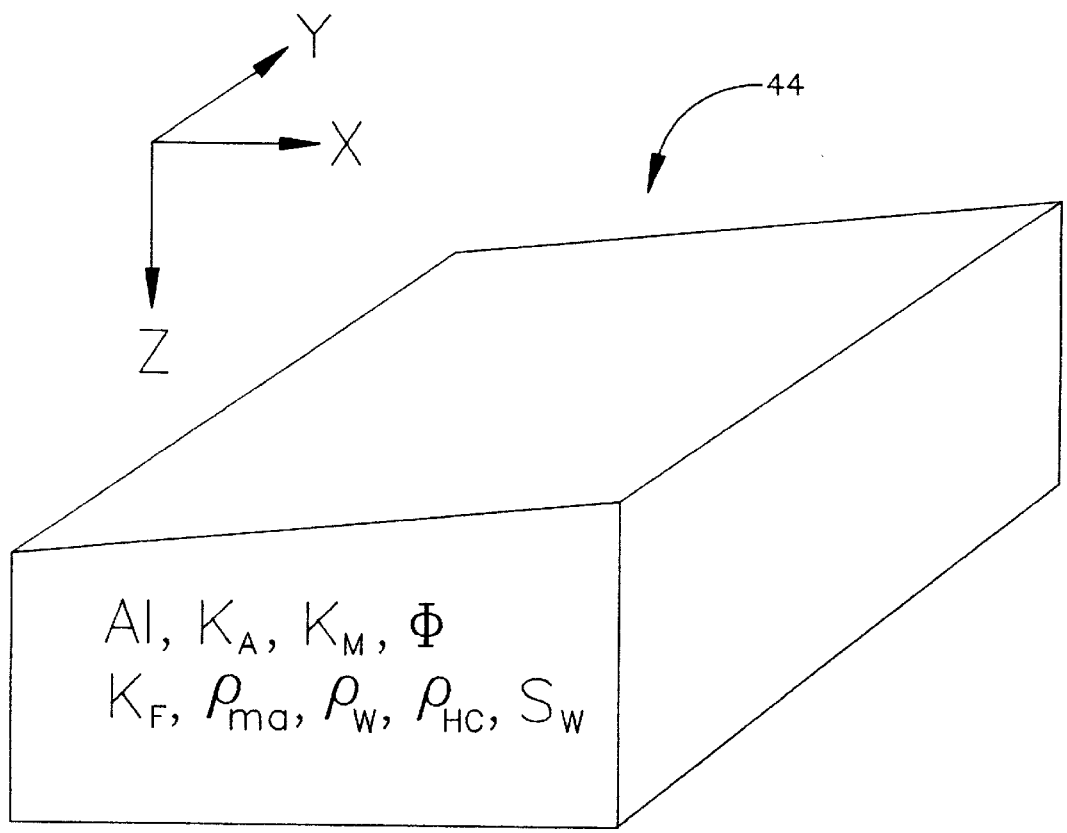
FIG. 5 is a schematic representation of a cell from the 3-D geologic model of FIG. 4, wherein the cell is populated with initial data.

Step 40 generates a 3-D geologic model by dividing the depth layered framework into a plurality of three-dimensional model cells or blocks. Referring additionally to FIG. 4, the 3-D geologic model of the geologic volume is shown and generally designated 42 and a representative cell is designated 44. 3-D geologic models of this type usually contain tens of millions of cells. The external boundary of the depth layered framework defines the model volume 46. The cells are ordered within the 3-D geologic model 42 so that no overlap occurs between the cells. Referring additionally to FIG. 5, the cell 44 is shown to have two dimensions expressed in units of length along axes x and y which typically delineate a rectangle or square in plan view. The cell 44 also has a third dimension expressed in units of length along the z axis which is representative of depth and delineates thickness. The specific dimensions of each cell are selected in response to the AI volume which is input into the 3-D geologic model and well data, if available. For example, the cell dimensions can be selected as a function of line by cross-line spacing by well log sampling rate. Fine layering of the cells can be configured such that the cells are divided equally between two depth layered framework horizons (proportional), parallel to a top horizon (on-lap) or parallel to the bottom horizon (off-lap).

FIGS. 4 and 5 are presented herein for purposes of illustration. The 3-D geologic model 42 and associated cells are but one possible configuration of the dimensional geologic model within the scope of the present invention. It is understood that the dimensional geologic model as taught herein is not constrained to any specific number of dimensions or units of expression. Nor are the cells constrained to any geometric configuration. it is, therefore, within the scope of the present invention to construct a dimensional geologic model of n-dimensions and having cells correspondingly dimensionally configured.

Referring again to FIGS. 3A, 3B, 3C the 3-D geologic model is populated with initial data values by steps 48 and 50. The time layered framework and depth layered framework cooperatively provide a 3-D velocity field which enables mapping of depth to time and provides correspondence between the 3-D geologic model and the AI volume. As a result, step 48 translates the x, y and z values for each cell of the 3-D geologic model to line, cross-line and time in the AI volume. The value of the seismic acoustic impedance at a given line, cross-line and time in the AI volume is extracted from the AI volume and loaded into the corresponding cell of the 3-D geologic model. This procedure is repeated until every cell in the 3-D geologic model is populated with an appropriate seismic acoustic impedance value from the AI volume. The same acoustic impedance value is often loaded into many cells due to the band limited nature, i.e., relatively low vertical resolution, of the AI volume.

Step 50 estimates values of the rock and fluid properties including the first predicted value of the designated rock or fluid property and distributes the estimated values to every cell in the 3-D geologic model. The rock and fluid properties are selected based on their utility in the petrophysical response model which is described below with reference to step 52. The values of the rock and fluid properties are estimated using known scientific and engineering principles and all available petrophysical data for the geologic volume. For example, well data may be available from well logs which provide certain localized well values of rock and fluid properties along the high resolution layers of the 3-D geologic model corresponding to well locations. Well data typically provides localized rock porosity values in addition to the identity of fluid types, such as gas, oil and water, and fluid saturation values. Other available data may include PVT calculations which provide estimates of fluid compressibility. Core samples provide grain densities and mineral composition of the rock. Distribution of the initial estimated values of the rock and fluid properties in the 3-D geologic model can be performed in accordance with any number of conventional techniques such as distance weighting, co-located co-kriging and the like. It may be necessary to retain the specific relationships between the initial estimated values of a given rock or fluid property provided by the distribution in subsequent adjustment steps of the present method. For example, the relative nature of strata porosity as a function of vertical location provided by the distribution must be retained in subsequent adjustment steps.

Step 52 establishes the petrophysical response model which is based on known relationships between rock and fluid properties and acoustic impedance. The petrophysical response model is distinct from the 3-D geologic model, being a system of response equations, wherein the predicted designated rock or fluid property is a primary independent variable and the predicted acoustic impedance is a primary dependent variable. The petrophysical response model is used to forward calculate predicted values of acoustic impedance using the estimated values of the rock and fluid properties including the predicted values of the designated rock or fluid property. Thus, the petrophysical response model describes how acoustic impedance varies with one or more rock and fluid properties including the designated fluid or rock property within the geologic volume.

The petrophysical response model is preferably derived from conventional predictive rock and fluid elastic moduli equations. An exemplary system of such equations is disclosed in Mavko, G., et al., editors; *Rock Physics Formulas*, Rock Physics Laboratory, Stanford University, 1993, incorporated herein by reference. Acoustic impedance (AI) is related to rock and fluid properties by the following system of equations:

$$AI = V_p \rho_b$$

where:
  $v_p$=compressional velocity
  $\rho_b$=bulk density
Compressional velocity is related to the rock and fluid properties by the First Christoffle equation:

$$v_p = [(K^* + 4/3 G^*)/\rho_b]^{1/2}$$

where:
  $K^*$=bulk modulus (inverse of system compressibility)
  $G^*$=shear modulus
The bulk modulus is calculated from the Gassmann expression:

$$K^* = K_A + [(1-(K_A/K_M)^2)/[(\Phi/K_F) + ((1-\Phi)/K_M) - (K_A/(K_M)^2)]]$$

where:
  $K_A$=frame modulus (inverse of dry rock compressibility)
  $K_M$=mineral modulus (inverse of grain compressibility)
  $\Phi$=rock porosity
  $K_F$=fluid modulus (inverse of fluid compressibility)
Shear modulus $G^*$ is estimated as a linear function of rock porosity.
Bulk density is calculated as:

$$\rho_b = \rho_{ma}*(1-\phi) + \phi(S_w*\rho_w + (1-S_w)*\rho_{HC})$$

where:
  $\rho_{ma}$=matrix density
  $\rho_w$=connate water density
  $\rho_{HC}$=hydrocarbon density at the correct PVT conditions $S_w$=reservoir water saturation As noted above with reference to estimating values of the rock and fluid properties, application of the model requires exhaustive use of all available petrophysical data for the geologic volume of interest. Well logs, if available, are examined to estimate variations, dependencies and limits on every parameter required by the petrophysical response model. PVT calculations are performed to estimate fluid compressibility. Levert J functions are used to estimate fluid saturations. Core samples are used in the determination of grain densities and mineral composition of the rock. Thus, the values of the designated rock or fluid property ultimately predicted by the present method are desirably constrained by physically acceptable values of the remaining rock and fluid properties used in the petrophysical response model.

Step 54 initiates a cell aggregate selection loop, wherein a grouping of contiguous cells is selected from the 3-D geologic model over which the seismic acoustic impedance is constant. The selected cell grouping described herein is a vertically stacked aggregate of contiguous cells, but it is understood that the present method likewise applies to selection of a horizontal aggregate of contiguous cells. Upon selection of the cell grouping, an error minimization loop is initiated within the cell aggregate selection loop which comprises steps 56, 58, 60, 62 and 64. Step 56 calculates the first predicted value of acoustic impedance for each cell of the grouping using the petrophysical response model and the estimated values of the rock and fluid properties including the first predicted value of the designated rock or fluid property. Step 58 weight averages the calculated first predicted values of acoustic impedance for each cell of the grouping over the entire cell grouping. Step 60 calculates the difference between the average first predicted value of acoustic impedance and the seismic value of acoustic impedance of the cell grouping by subtracting the average first predicted value from the seismic value.

The absolute value of the difference between the average predicted value and seismic value of acoustic impedance is the objective function desirably minimized by the algorithm of the error minimization loop. If the absolute value of the difference exceeds a maximum tolerance, for example, 1%, step 62 adjusts the first predicted value of the rock or fluid property within acceptable limits to a second predicted value. As indicated by step 64, the first predicted value of the designated rock or fluid property is adjusted such that the second predicted value reduces the objective function of the difference between the first average predicted value and the seismic value of acoustic impedance of the cell grouping when the second predicted value is substituted for the first predicted value of the designated rock or fluid property in the petrophysical response model. The direction in which the first predicted value of the rock or fluid property is adjusted is determined by the sign of the difference between the average predicted value and the seismic value of acoustic impedance.

Step 64 returns the error minimization loop to step 56, wherein a second predicted value of acoustic impedance is calculated using the petrophysical response model and the estimated values of the rock and fluid properties including the second predicted value of the designated rock or fluid property which replaces the first predicted value. Steps 58, 60, 62 and 64 are repeated as often as necessary until the absolute value of the difference between the predicted value of acoustic impedance and the seismic value of acoustic impedance for the selected cell grouping is less than or equal to the maximum tolerance. The predicted value of the designated rock or fluid property for each cell of the grouping which achieves this result is the error minimized value of the designated rock or fluid property for that cell. It is apparent that only the predicted values of acoustic impedance and the predicted values of the designated rock and fluid property are varied during the error minimization loop, while the remaining estimated values of the rock and fluid properties, the seismic values of acoustic impedance, and the form of the response equations of the petrophysical response model are maintained fixed.

Step 66 updates the 3-D geologic model by repopulating the selected cells of the 3-D geologic model with the error minimized values of the designated rock or fluid property. In particular, the newly-determined error minimized values of the designated rock or fluid property are substituted for each corresponding first predicted value of the designated rock or fluid property populated into the 3-D geologic model in step 50. Step 68 returns the cell aggregate selection loop to step 54, wherein another grouping of contiguous cells is selected from the 3-D geologic model over which the seismic acoustic impedance is constant. The error minimization loop is performed for the newly-selected grouping of contiguous cells to determine the error minimized values of the designated rock or fluid property for these cells. These error minimized values are then updated into the 3-D geologic model. The cell aggregate selection loop is repeated as often as necessary in the above-recited manner until an error minimized value of the designated rock or fluid property is determined for every cell in the 3-D geologic model.

An additional feature of the present method is selection of the designated rock or fluid property. Selection of an appropriate designated rock or fluid property enables the practitioner to accurately characterize the fluid reservoir within the geologic volume when the 3-D geologic model is populated with the error minimized values of the property. The practitioner typically selects the designated rock or fluid property in association with or preliminary to the above-recited steps of FIG. 4. The selection criteria are within the purview of the skilled artisan and are a function of the specific needs of the practitioner. Typically the selection criteria are a function of the desired application of the resulting 3-D geologic model and error minimized data values. For example, one skilled in the art generally recognizes porosity, fluid type, or saturation as a meaningful rock or fluid property in hydrocarbon exploration applications. Similarly, one skilled in the art generally recognizes porosity, fluid type, or permeability as a meaningful rock or fluid property in reservoir management applications. Therefore, although the present method is not limited to any specific designated rock or fluid property, the above-recited rock and fluid properties, i.e., porosity, fluid type, saturation, and permeability, are exemplary of designated rock or fluid properties having utility in the present method.

Figure 6:
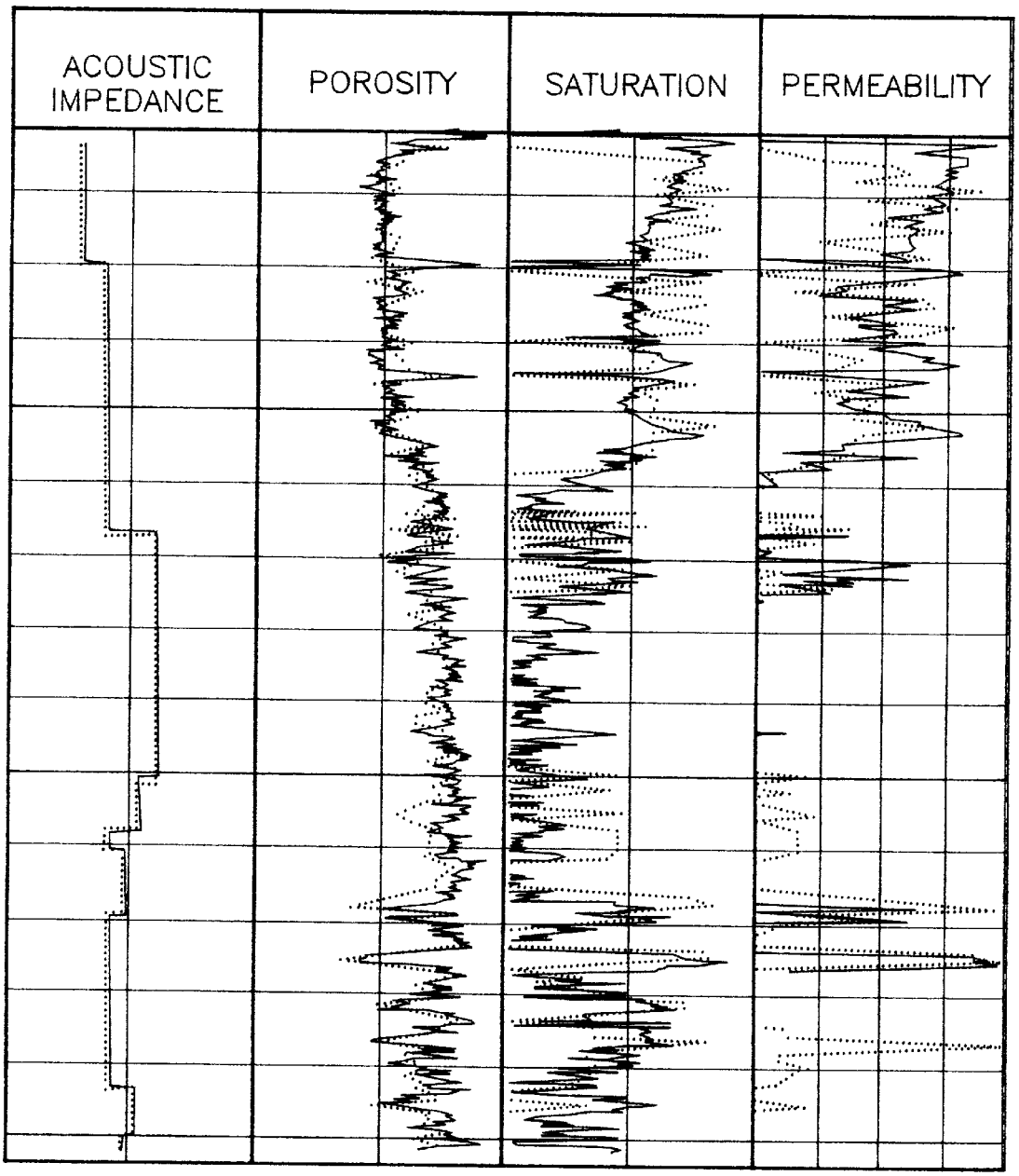
FIG. 6 is a graphical representation of predicted data for rock and fluid properties determined in accordance with the method of FIG. 1.

The ability of the present method to accurately predict values of a designated rock or fluid property is demonstrated by FIG. 6. Porosity is selected as the designated rock or fluid property for this application. Error minimized values of porosity are determined along the length of a well bore in accordance with the present method. Estimated values of rock and fluid properties, i.e., saturation and permeability, and predicted values of acoustic impedance are also determined along the length of the well bore in accordance with the present method. These values are plotted on separate vertical axes with a dotted line. Actual measured experimental values of porosity, saturation, permeability, and acoustic impedance are plotted on the same respective axes with a solid line for comparison. It is evident that the present method accurately predicts the values of porosity in the geologic volume, achieving a close fit between the error minimized values and measured experimental values of porosity even when the estimated values of the remaining rock and fluid properties of the petrophysical response model are less accurate.

While the foregoing preferred embodiments of the invention have been described and shown, it is understood that alternatives and modifications, such as those suggested and others, may be made thereto and fall within the scope of the present invention.

We claim:

1. A method for determining a value of a designated rock or fluid property in a subterranean geologic volume, the method comprising:

assigning an experimentally determined seismic value of acoustic impedance to a model volume correlated to a subterranean geologic volume;

designating a rock or fluid property relevant to said geologic volume;

assigning a first predicted value of said designated rock or fluid property to said model volume;

calculating a first predicted value of acoustic impedance for said model volume from a response model using said first predicted value of said designated rock or fluid property, wherein said response model is responsive to changes in predicted values of said designated rock or fluid property;

comparing said first predicted value of acoustic impedance to said seismic value of acoustic impedance to determine a difference between said predicted and seismic values of acoustic impedance; and adjusting said first predicted value of said designated rock or fluid property in response to said difference to create a second predicted value of said designated rock or fluid property, wherein said second predicted value reduces said difference.

2. The method of claim 1 further comprising using said second predicted value or a succeeding adjusted predicted value of said designated rock or fluid property to explore for a hydrocarbon-bearing reservoir in said geologic volume.

3. The method of claim 1 further comprising using said second predicted value or a succeeding adjusted predicted value of said designated rock or fluid property to exploit production of hydrocarbons from a hydrocarbon-bearing reservoir in said geologic volume.

4. A method for iteratively determining an error-minimized value of a designated rock or fluid property at a location in a subterranean geologic volume, said method comprising:

providing a subterranean geologic volume having an experimentally determined distribution of seismic values of acoustic impedance;

characterizing said geologic volume by a model volume having a plurality of model subvolumes;

selecting a model subvolume from said plurality of model subvolumes;

assigning a seismic value of acoustic impedance from said distribution to said model subvolume;

designating a rock or fluid property relevant to said geologic volume;

assigning a first predicted value of said designated rock or fluid property to said model subvolume;

calculating a first predicted value of acoustic impedance for said model subvolume from a response model using said first predicted value of said designated rock or fluid property, wherein said response model is responsive to changes in predicted values of said designated rock or fluid property;

comparing said first predicted value of acoustic impedance to said seismic value of acoustic impedance to determine a first difference between said predicted and seismic values of acoustic impedance; and adjusting said first predicted value of said designated rock or fluid property in response to said first difference to create a second predicted value of said designated rock or fluid property, wherein said second predicted value reduces said first difference.

5. The method of claim 4 further comprising iteratively repeating said steps of adjusting said predicted value of said designated rock or fluid property, calculating said predicted value of said acoustic impedance using said adjusted predicted value of said designated rock or fluid property, and comparing said calculated predicted value of acoustic impedance to said seismic value of acoustic impedance to determine said difference between said calculated predicted and seismic values of acoustic impedance.

6. The method of claim 5 wherein said iterative repetition is terminated when said difference does not exceed a predetermined maximum tolerance.

7. The method of claim 6 wherein said predicted value of said designated rock or fluid property upon termination of said iterative repetition is an error minimized value of said designated rock or fluid property.

8. The method of claim 4 wherein said response model has a plurality of rock and fluid properties as model parameters including said designated rock or fluid property.

9. The method of claim 8 wherein said plurality of rock and fluid properties include elastic rock and fluid moduli.

10. The method of claim 9 further comprising assigning estimated values of said plurality of rock and fluid properties to said model subvolume in addition to said first predicted value of said designated rock or fluid property.

11. The method of claim 10 further comprising maintaining said estimated values of said plurality of rock and fluid properties other than said designated rock or fluid property fixed while adjusting said first predicted value of said designated rock or fluid property.

12. The method of claim 4 further comprising correlating said model subvolume to a location in said geologic volume.

13. The method of claim 4 wherein said selected model subvolume is a first model subvolume included within a grouping of contiguous model subvolumes having a common seismic value of acoustic impedance.

14. The method of claim 13 wherein said predicted values of acoustic impedance for all said model subvolumes in said grouping are averaged to create an average predicted value of acoustic impedance for said grouping and said difference is determined between said average predicted value of acoustic impedance and said common seismic value of acoustic impedance for said grouping.

15. The method of claim 4 wherein said designated rock or fluid property is selected from the group consisting of porosity, fluid type, saturation and permeability.

16. The method of claim 4 further comprising:

selecting a second model subvolume from said plurality of model subvolumes;

assigning a seismic value of acoustic impedance from said distribution to said second model subvolume;

assigning a first predicted value of said designated rock or fluid property to said second model subvolume;

calculating a first predicted value of acoustic impedance for said second model subvolume from said response model using said first predicted value of said designated rock or fluid property for said second model subvolume;

comparing said first predicted value of acoustic impedance to said seismic value of acoustic impedance for said second model subvolume to determine a first difference between said predicted and seismic values of acoustic impedance for said second subvolume; and adjusting said first predicted value of said designated rock or fluid property for said second model subvolume in response to said first difference to create a second predicted value of said designated rock or fluid property for said second model subvolume, wherein said second predicted value reduces said first difference.

17. The method of claim 16 wherein said second model subvolume is included within a second grouping of contiguous model subvolumes having a common seismic value of acoustic impedance.

18. The method of claim 17 wherein said predicted values of acoustic impedance for all said model subvolumes in said second grouping are averaged to create an average predicted value of acoustic impedance for said second grouping and said difference is determined between said average predicted value of acoustic impedance and said common seismic value of acoustic impedance for said second grouping.

19. The method of claim 4 further comprising calculating a second predicted value of acoustic impedance for said model subvolume from said response model using said second predicted value of said designated rock or fluid property.

20. The method of claim 19 further comprising comparing said second predicted value of acoustic impedance to said seismic value of acoustic impedance to determine a second difference between said predicted and seismic values of acoustic impedance, wherein said second difference is less than said first difference.

21. The method of claim 4 further comprising using said second predicted value or a succeeding adjusted predicted value of said designated rock or fluid property to explore for a hydrocarbon-bearing reservoir in said geologic volume.

22. The method of claim 4 further comprising using said second predicted value or a succeeding adjusted predicted value of said designated rock or fluid property to exploit production of hydrocarbons from a hydrocarbon-bearing reservoir in said geologic volume.

23. A method for determining a value of a rock or fluid property in a subterranean geologic model subvolume comprising:

providing a subterranean geologic volume having an experimentally determined distribution of seismic values of acoustic impedance;

characterizing said geologic volume by a model volume having a plurality of model subvolumes;

assigning a seismic value of acoustic impedance from said distribution to each of said model subvolumes;

designating a rock or fluid property relevant to said geologic volume;

assigning a first predicted value of said designated rock or fluid property to each of said model subvolumes;

selecting a first grouping of contiguous model subvolumes from said plurality of model subvolumes, wherein each model subvolume of said first grouping has a common seismic value of acoustic impedance;

calculating a first predicted value of acoustic impedance for each model subvolume of said first grouping from a response model using said first predicted value of said designated rock or fluid property for said respective model subvolume, wherein said response model is responsive to changes in predicted values of said designated rock or fluid property;

averaging said first predicted values of acoustic impedance for all said model subvolumes of said first grouping to create an averaged first predicted value of acoustic impedance for said first grouping;

comparing said averaged first predicted value of acoustic impedance to said common seismic value of acoustic impedance to determine a first difference between said averaged first predicted value and said common seismic value;

adjusting said first predicted value of said designated rock or fluid property for each model subvolume of said first grouping in response to said first difference to create a second predicted value of said designated rock or fluid property for each model subvolume of said first grouping, wherein said second predicted value reduces said first difference;

calculating an averaged second predicted value of acoustic impedance for said first grouping from said petrophysical response model, wherein said second predicted value of said rock or fluid property is substituted for said first predicted value of said rock or fluid property in said petrophysical response model; and determining said difference between said averaged second predicted value and said common seismic value of acoustic impedance and iteratively repeating said steps of adjusting said predicted value of said designated rock or fluid property and recalculating said averaged predicted value of acoustic impedance for said first grouping until said difference does not exceed a predetermined maximum tolerance.

24. The method of claim 23 further comprising:

selecting a second grouping of contiguous model subvolumes from said plurality of model subvolumes, wherein each model subvolume of said second grouping has a common seismic value of acoustic impedance;

calculating a first predicted value of acoustic impedance for each model subvolume of said second grouping from said response model using said first predicted value of said designated rock or fluid property for said respective model subvolume;

averaging said first predicted values of acoustic impedance for all said model subvolumes of said second grouping to create an averaged first predicted value of acoustic impedance for said second grouping;

comparing said averaged first predicted value of acoustic impedance to said common seismic value of acoustic impedance for said second grouping to determine a first difference between said averaged first predicted value and said common seismic value;

adjusting said first predicted value of said designated rock or fluid property for each model subvolume of said second grouping in response to said first difference to create a second predicted value of said designated rock or fluid property for each model subvolume of said second grouping, wherein said second predicted value reduces said first difference;

calculating an averaged second predicted value of acoustic impedance for said second grouping from said petrophysical response model, wherein said second predicted value of said rock or fluid property is substituted for said first predicted value of said rock or fluid property in said petrophysical response model; and determining said difference between said averaged second predicted value and said common seismic value of acoustic impedance for said second grouping and iteratively repeating said steps of adjusting said predicted value of said designated rock or fluid property and recalculating said averaged predicted value of acoustic impedance for said second grouping until said difference does not exceed a predetermined maximum tolerance.

25. The method of claim 23 further comprising repeating said steps of selecting a grouping of contiguous model subvolumes, averaging said predicted values of acoustic impedance, determining a difference between said averaged predicted value and said common value of seismic impedance, adjusting said first predicted value of said designated rock or fluid property for each model subvolume of said grouping to reduce said difference, recalculating said averaged predicted value of acoustic impedance from said petrophysical response model, redetermining said difference and iteratively repeating said steps until said difference does not exceed said maximum tolerance for substantially every grouping of models subvolume in said model volume having a common seismic value of acoustic impedance.

26. The method of claim 23 further comprising using an adjusted predicted value of said designated rock or fluid property to explore for a hydrocarbon-bearing reservoir in said geologic volume.

27. The method of claim 23 further comprising using an adjusted predicted value of said designated rock or fluid property to exploit production of hydrocarbons from a hydrocarbon-bearing reservoir in said geologic volume.

* * * * *